Patented Feb. 19, 1924.

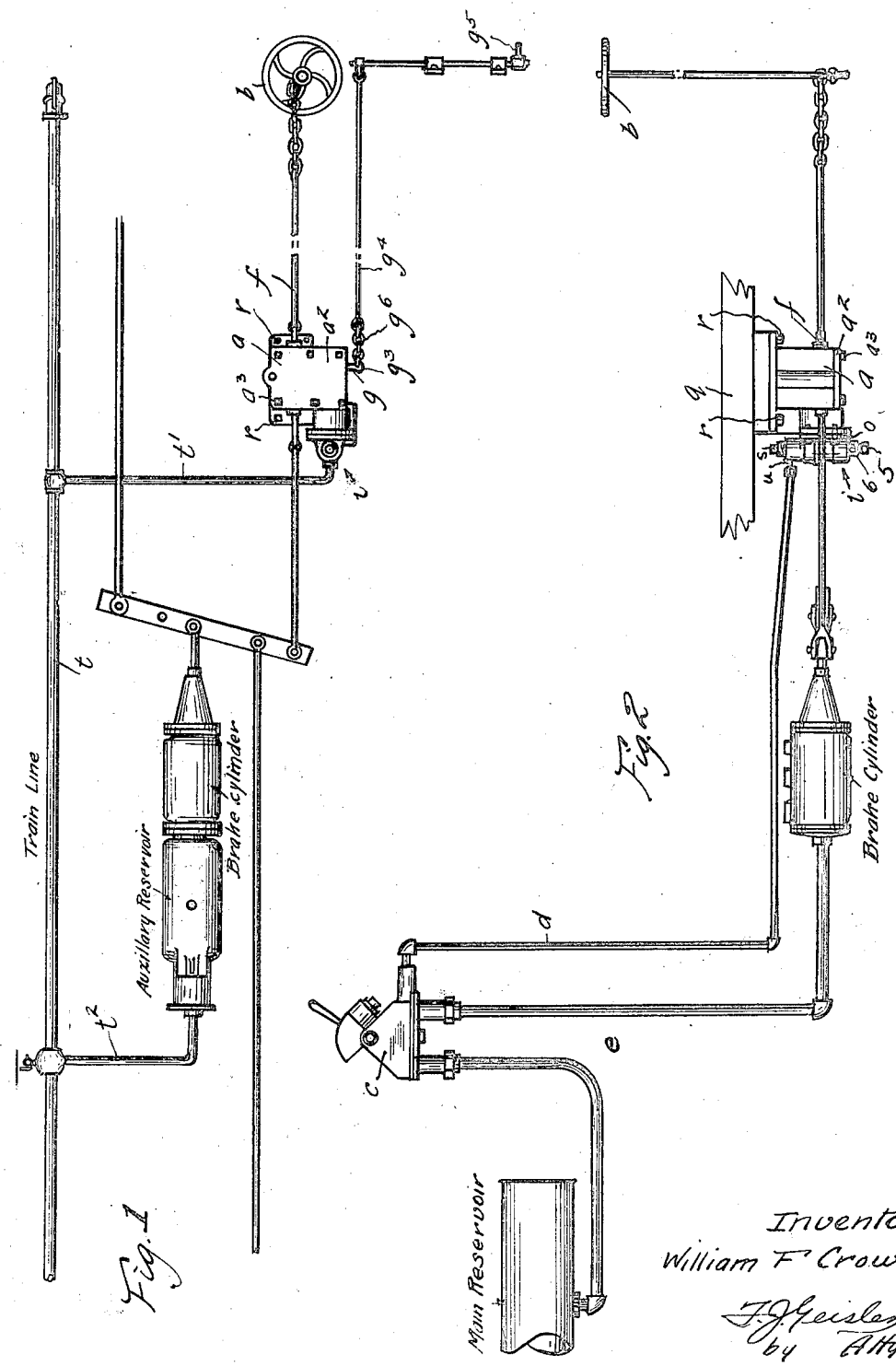

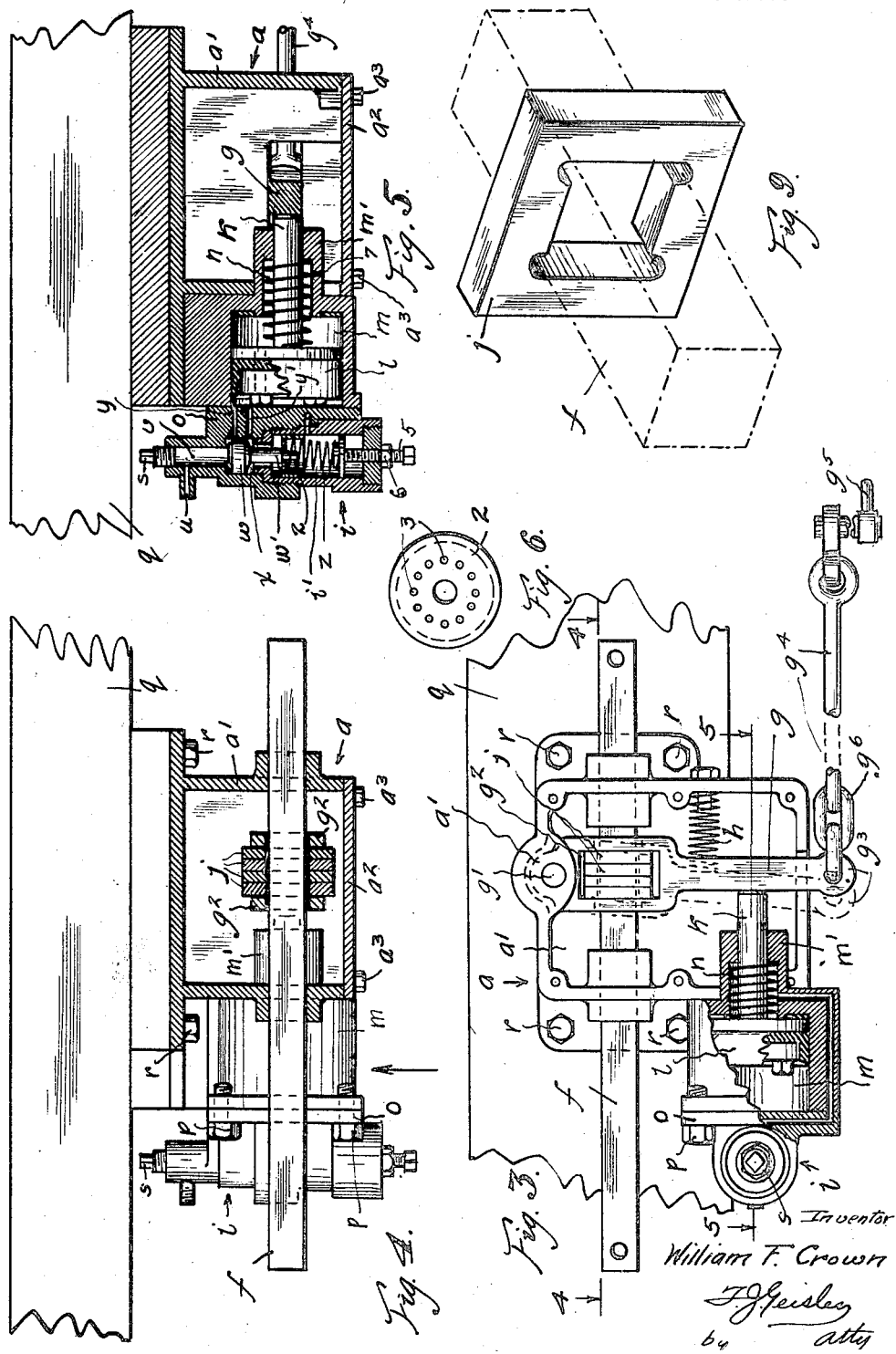

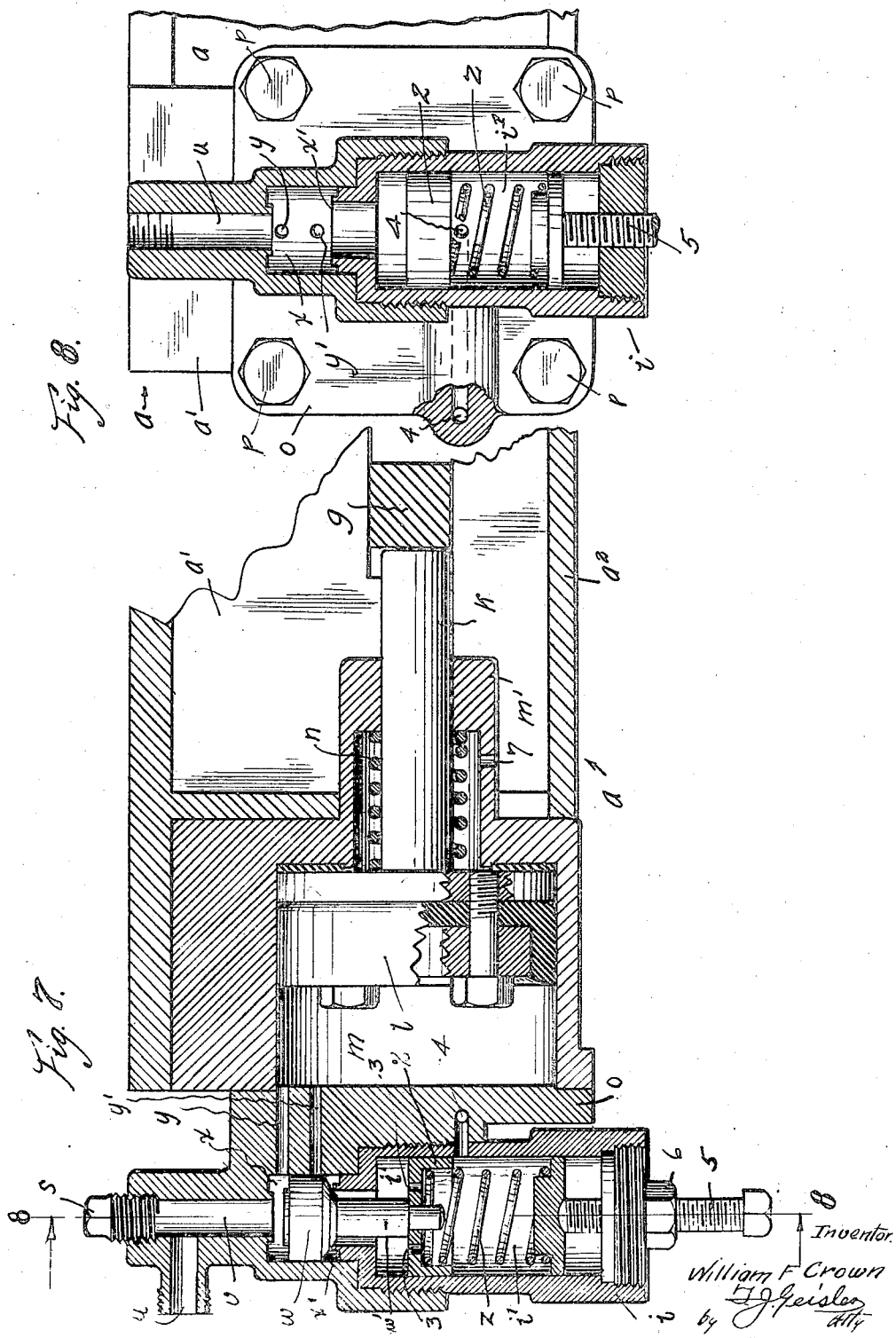

1,484,475

UNITED STATES PATENT OFFICE.

WILLIAM F. CROWN, OF CHEHALIS, WASHINGTON.

AUTOMATIC SAFETY LOCK FOR AIR BRAKES.

Application filed February 9, 1922. Serial No. 535,335.

*To all whom it may concern:*

Be it known that I, WILLIAM F. CROWN, a citizen of the United States, and a resident of the city of Chehalis, county of Lewis, and State of Washington, have invented a certain new and useful Improvement in Automatic Safety Locks for Air Brakes, of which the following is a specification.

My invention relates to safety devices provided in air brakes, whereby the brakes are held in the maximum position attained, independently of the air operated devices.

Air brakes can not be relied upon to hold the brakes set to the wheels, because leakage of air is liable to occur. In consequence, automatic auxiliary means must be provided to hold the brake operating devices against brake releasing movement when the air fails to function efficiently.

A device of the character mentioned is shown in the patent granted Jan. 22, 1918 to R. B. Liedloff, No. 1,254,246, entitled Auxiliary brake mechanism. By examination of this patent it is seen that the brake holding means comprise a clutch-lever and a bore thru which the brake rod, or its connection with the piston cylinder, extends. The clutch-lever is normally thrown at an oblique angle to the line of motion of the brake rod by automatic means—a spring, in such oblique position holding the brake operating devices against releasing movement; and the clutch lever is positioned at right angles to said line of motion by air operated means connected with the same source of compressed air to which the brake cylinder is connected. When the clutch-lever is placed in such right angular position it permits the brake operating devices to have releasing movement.

The inefficiency of these safety devices will now be pointed out. As apparent, the air pressure placing said clutch lever in its inactive position is in balance, so to speak, with the spring provided to throw said clutch lever into its active position. The operation of the clutch-lever to hold the brake operating devices as air set and against releasing movement is solely dependent upon the power of said spring, but the spring can act only as said opposing air pressure is relieved. Hence, the action of the clutch lever is too slow and too unreliable. There are no means for providing a quick release of the compressed air opposing the said spring.

Therefore one of the main purposes of my invention is to provide efficient means by which the quick release of said air is effected.

I attain my object by connecting the said air operated restraining means by a conduit with the source of air under pressure which supplies the air brake cylinder; also provide said air restraining means with an air vent; and further provide a valve which controls both the admission of air from said conduit into said restraining means, and the escape of air from the latter thru its vent.

A further object of my invention is so to arrange that element of my safety device by which the brakeholding force is directly applied to the brake rod that it may be conveniently kept in efficient condition by repair, removal and replacement when excessively worn, or broken.

A further object of my invention is so to arrange the said controlling valve that after once having been opened by pressure in said conduit it will remain open, notwithstanding limited decrease in said pressure.

Other features of my invention will be referred to in the body of this specification.

The arrangement and operation of my said safety device are illustrated in the accompanying drawings, in which:

Fig. 1 is a diagrammatic plan view of a standard arrangement of the indirect type of air brake embodying my safety device;

Fig. 2 is a diagrammatic side elevation of the direct type of air brake also embodying my invention;

Fig. 3 is a plan view partly in section, of my safety device with the cover of its housing removed to show the arrangement of the parts of my invention; this figure also showing the manually operated means by which my safety device may be released by hand, when the brakes have been set either by air or manually;

Fig. 4 is a sectional view taken on the line 4—4 of Fig. 3 and particularly illustrates that the gripping element of my safety device consists of a plurality of rings which are mounted loosely on the brake rod, and either of which may be repaired or removed and replaced as required to keep my safety device in good condition;

Fig. 5 is a cross sectional view taken on the line 5—5 of Fig. 3 with the piston of the air-operated clutch-lever restraining means moved to the position which permits said clutch-lever to be thrown into its active position by the spring $h$;

Fig. 6 is a detail of construction showing the cup against which one end of the valve spring of my device bears;

Fig. 7 is an enlarged view of Fig. 5 with the piston moved to a position holding said clutch-lever in its inactive position;

Fig. 8 is a cross section on the line 8—8 of Fig. 7 with the valve $w$ removed so as to show the ports controlled by said valve and the chamber and seat of the latter; and Fig. 9 is a perspective view of one of the rings comprising the removable gripping-element of the clutch-lever of my safety device; the gripping element being illustrated as mounted on the brake rod, so that its action on the latter may be more readily described.

The construction and operation of my device is as follows:

In Fig. 1 I have shown my device $a$ as an auxiliary safety device coupled with the indirect type of air brake. Air is held at a predetermined pressure in the train line $t$ which has one outlet $t^2$ to the auxiliary reservoir, and one outlet $t'$ to my device. It is to be noted that my device restrains the action of the manually operated hand brake $b$ as well as the action of the air operated brakes. The device $a$ can be released manually by means of the arm $g$ which is connected to the links $g^6$ which are fastened to the rod $g^4$ which in turn is operated by the handle $g^5$.

Fig. 2 represents the direct type of air brake embodying my invention. Air passes from the main reservoir thru the throttle valve $c$ which controls the passage of air to the brake cylinder thru the line $e$, or to my device $a$ thru the line $d$. As the brakes in the direct system are operated on an increase in pressure and my device is adapted to work on a decrease in pressure, it is necessary that a valve as $c$ be provided to cut the air from one line when air is applied to the other.

As shown in Fig. 3, my device $a$ clutches the brake-rod $f$ when the arm $g$, which is pivotally mounted in the housing $a'$ on the pin $g'$, is not at right angles to the rod $f$. $a^2$ is a cover which is bolted to the housing $a$ by bolts $a^3$. $h$ is a compression spring which tends to hold the arm $g$ at an oblique angle to the action of the brake rod $f$. The eye $g^2$ in the arm $g$ serves as a slot in which the gripping elements $j$ are loosely mounted on the brake rod $f$. $k$ is a piston pin which is attached to the piston $l$ and holds the arm $g$ normal to the line of motion of brake-rod $f$ when the pressure from the air line has reached a predetermined amount. $m$ is the cylinder in which piston $l$ works and $n$ is the piston spring which lies in the neck portion $m'$ of the cylinder $m$. $o$ is the cylinder head which is bolted to the cylinder by means of the bolts $r$. $t$ is the train line and $t'$ is the conduit which conveys air to the valve $i$. This valve $i$ has in it an inlet hole $u$ and a port $v$ which is stopped at one end by the plug $s$. The valve piston $w$ works in the valve chamber $x$ and seats against the port $v$. This port $v$ makes the upper seat and the lower seat $x'$ is the upper end of the spring chamber $i'$. The lower end of the valve piston $w$ is marked $w'$ and the spring retaining cup 2 bears on the valve spring $z$ and moves the valve piston from its lower to its upper seat. When the valve piston $w$ is on its lower seat the upper horizontal port $y$ is opened which allows the pressure from the train line to enter into the cylinder $m$ and which acts on the piston $l$ so as to throw the arm $g$ normal to the brake rod $f$. When the spring $z$ overcomes the pressure from the train line $t$ the valve piston $w$ is thrown to its upper seat thus uncovering the lower horizontal port $y'$ which action allows the air to be released from the cylinder $m$ and out thru the holes 3 in the spring retaining cup 2 and thru the hole 4 which opens into the neck $m'$. The air can pass out thru the hole 7 which opens to the interior of the housing $a'$. An adjusting screw 5 works in the nut 6 and regulates the tension of the valve spring $z$. It is to be noted that the port $v$ is of smaller diameter than the head of the piston $w$, so that greater pressure must be exerted to unseat the piston than that which is required to reseat the same. This is because of the difference in cross sectional area of the relative surfaces acted upon by the air. Thus, when the piston has once been unseated the action is very swift and the piston can be held in the new position even tho the air pressure is decreased to a limited extent.

The operation of my device when used with indirect or automatic system is as follows:

Starting with the brakes in released position and the train line $t$ containing air held at a predetermined pressure; upon a decrease in pressure the auxiliary reservoir and brake cylinder force the brakes into their operative position by forcing the brake rod towards the right as viewed in the various figures. This decrease in pressure also affects my control mechanism in that the compressed spring $n$ is permitted to force the piston towards the left as viewed in Fig. 7 and thus permits the elements $j$ to grip the brake shaft and to hold it in air set position.

When the train line is again filled with air to the predetermined position it will pass from the train line *t* to the pipe *t'* into the inlet opening *u* and the port *v*. This pressure will force the valve *w* downwardly against the spring *z* and will thus uncover the port *y*. The air pressure will then be permitted to act against the piston *l* and thus will force the arm *g* into a position perpendicular to the brake rod *f* and will thus release the gripping of the elements *j*. This will permit the auxiliary reservoir and brake cylinder to release the brakes and permit the car controlled by them to again move.

The operation of my device with the direct system is similar except that, as before mentioned, air is applied to the brake cylinder from the main reservoir to apply the brakes. Thus, the air passes from the main reservoir through the valve *c* and the pipes *e* to the brake cylinder which forces the brakes into operative position. The valve *c* operates so that when the throttle opens the connection to the valve *e* it will simultaneously disconnect the air from the pipe *d* and also will open this pipe to the atmosphere so that any air under pressure contained therein will be permitted to escape. Thus, upon an application of air into the pipe *b* the pipe *d* will be simultaneously released of any air under pressure contained therein.

This, as in the indirect system, will cause a decrease in pressure in the cylinder *a*, which will permit the piston *l* to move towards the left and thus set my control mechanism.

When the brakes are released by the movement of the valve *c* in the opposite direction it will simultaneously cut off the air from the pipe *e* and will connect the air with the pipe *b*. Thus, it will force air into the piston *l* and will move the piston towards the right and will thus arrange the arm *g* perpendicular with the brake rod *f* and will thus release the grip of the elements *j* on the brake rod *f*.

I claim:

1. The combination with air-operated brake-applying devices of, auxiliary means for holding the brake applying devices against releasing movement, such means comprising a clutch-lever having a bore thru which the brake-operating member extends, automatic means for throwing said clutch-lever at an oblique angle to the line of motion of said brake operating member, a cylinder and piston therein operating to place said clutch-lever in a position normal to said line of motion, this cylinder having an air vent, a conduit connecting said cylinder with the source of air under pressure which supplies the air-brake cylinder, a valve controlling the admission of air from said conduit into said cylinder and the escape of air therefrom thru said vent, and automatic means holding said valve shut against a predetermined pressure in said conduit.

2. The combination with air-operated brake-applying devices of, auxiliary means for holding the brake applying devices against releasing movement, such means comprising a clutch-lever having a bore thru which the brake-operating member extends, automatic means for throwing said clutch-lever at an oblique angle to the line of motion of said brake operating member, a cylinder and piston therein operating to place said clutch-lever in a position normal to said line of motion, this cylinder having an air vent, a conduit connecting said cylinder with the source of air under pressure which supplies the air-brake cylinder, a valve controlling the admission of air from said conduit into said cylinder and the escape of air therefrom thru said vent, and automatic adjustable means holding said valve shut against a predetermined pressure in said conduit.

3. The combination with air-operated brake applying devices of, auxiliary means for holding the brake applying devices against releasing movement, such means comprising a clutch-lever having a bore thru which the brake-operating member extends, automatic means for throwing said clutch-lever at an oblique angle to the line of motion of said brake operating member, a cylinder and piston therein operating to place said clutch-lever in a position normal to said line of motion, this cylinder having an air vent, a conduit connecting said cylinder with the source of air under pressure which supplies the air-brake cylinder, a valve controlling the admission of air from said conduit into said cylinder and the escape of air therefrom thru said vent, automatic means holding said valve shut against a predetermined pressure in said conduit, said valve being adapted to be unaffected, after having been opened, by limited decrease in said pressure.

4. The combination with air-operated brake applying devices of, auxiliary means for holding the brake applying devices against releasing movement, such means comprising a clutch-lever having a bore thru which the brake-operating member extends, automatic means for throwing said clutch-lever at an oblique angle to the line of motion of said brake operating member, a cylinder and piston therein operating to place said clutch-lever in a position normal to said line of motion, this cylinder having an air vent, a conduit connecting said cylinder with the source of air under pressure which supplies the air-brake cylinder, a valve controlling the admission of air from said conduit into said cylinder and the escape of air therefrom thru said vent, automatic means holding said valve shut against a predetermined pressure in said conduit, said valve being adapted to be unaffected, after having been opened, by limited decrease in said pressure.

5. In air-brake mechanism provided with automatic air operated brake setting and releasing devices of the character described, a spring controlled clutch-lever provided at one end with spaced portions through which the brake-operating rod extends, and pivoted at such end, a plurality of gripping elements loosely mounted on said brake-operating rod between said spaced portions, provided with biting edges to engage with said brake-operating rod when said clutch lever is placed in oblique position with the latter, but releasing when said lever is perpendicular therewith, the face of said clutch lever being connected to said releasing means.

WILLIAM F. CROWN.